(12) United States Patent
Seifert et al.

(10) Patent No.: US 6,770,110 B1
(45) Date of Patent: Aug. 3, 2004

(54) FILTERING DEVICE COMPRISING A DETACHABLE FILTER HOUSING

(75) Inventors: Bodo-Siegfried Seifert, Ulm (DE); Rudolf Stetter, Balzheim (DE); Ulrich Eppensteiner, Sinsheim (DE); Thomas Schafer, Ketsch (DE)

(73) Assignees: Brueninghaus Hydromatik GmbH, Elchingen (DE); K. & H. Eppensteiner GmbH & Co. KG, Ketsch/Rhein (DE)

( * ) Notice: Subject to any disclaimer, the term of this patent is extended or adjusted under 35 U.S.C. 154(b) by 0 days.

(21) Appl. No.: 09/959,181

(22) PCT Filed: Apr. 17, 2000

(86) PCT No.: PCT/EP00/03463

§ 371 (c)(1),
(2), (4) Date: Feb. 12, 2002

(87) PCT Pub. No.: WO00/62893

PCT Pub. Date: Oct. 26, 2000

(30) Foreign Application Priority Data

Apr. 19, 1999 (DE) .......................................... 199 17 567

(51) Int. Cl.[7] .............................................. B01D 27/08
(52) U.S. Cl. ........................... 55/498; 55/502; 210/352; 210/440; 210/454; 210/DIG. 17
(58) Field of Search ......................... 55/498, 502, 504; 210/352, 440, 441, 442, 450, 451, 454, DIG. 17

(56) References Cited

U.S. PATENT DOCUMENTS

| 3,040,894 | A | | 6/1962 | Pall | |
| 3,235,085 | A | * | 2/1966 | Humbert, Jr. | 210/130 |
| 3,241,679 | A | * | 3/1966 | Walter | 210/444 |
| 3,282,429 | A | * | 11/1966 | Wood et al. | 210/136 |
| 3,572,509 | A | * | 3/1971 | Dexter | 210/130 |
| 3,608,724 | A | * | 9/1971 | Baldwin | 210/130 |
| 4,316,801 | A | | 2/1982 | Cooper | |
| 4,465,595 | A | | 8/1984 | Cooper | |
| 4,872,976 | A | * | 10/1989 | Cudaback | 210/130 |
| 5,230,795 | A | | 7/1993 | Yang | |
| 5,688,396 | A | | 11/1997 | Baumann et al. | |
| 5,888,384 | A | * | 3/1999 | Wiederhold et al. | 210/130 |
| 6,485,635 | B1 | * | 11/2002 | Gandini et al. | 210/117 |

FOREIGN PATENT DOCUMENTS

| DE | 1 040 843 | 10/1958 |
| DE | 1 461 446 | 4/1969 |
| DE | 1 909 130 | 9/1970 |
| DE | 41 31 353 A1 | 10/1992 |
| DE | 43 10 234 C1 | 8/1994 |
| DE | 694 00 421 T2 | 8/1996 |
| DE | 196 37 004 A1 | 2/1998 |
| EP | 0 547 291 A1 | 6/1993 |
| GB | 2 307 422 A | 5/1997 |

* cited by examiner

Primary Examiner—Frank M. Lawrence
(74) Attorney, Agent, or Firm—Scully, Scott, Murphy & Presser

(57) ABSTRACT

The invention relates to a filtering device (1) comprising a tubular filter (6). One end of said filter is supported on a base part (2) and the other end is supported on a cupped filter housing (3). The filter housing overlaps the filter (6) with a radial clearance (7) and is detachably connected via the edge (4) thereof to the base part (2). The base part (2) comprises a first flow-through channel (33) which is connected to the clearance (7) and comprises a second flow-through channel (34) which is connected to a cavity (35) of the filter (6). The aim of the invention is to make it possible to attach or detach the filter housing (3) even when tight spatial relationships are present in the vicinity of the filter housing (3) or in order to hold the filter (6) in position against the filter housing (3).

14 Claims, 2 Drawing Sheets

FILTERING DEVICE COMPRISING A DETACHABLE FILTER HOUSING

Figure 1:
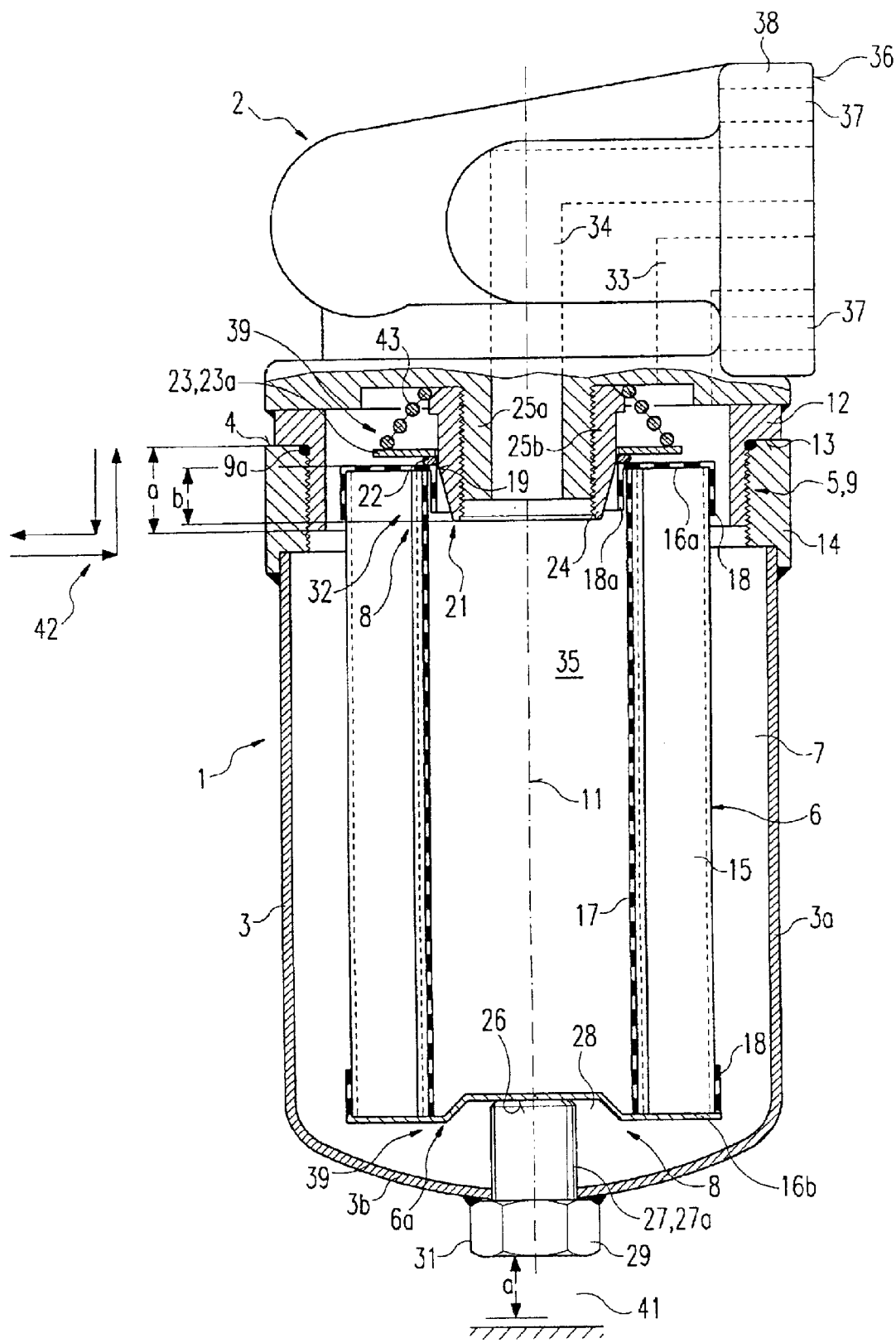

The present invention relates to a filtering device according to the preamble of claim 1.

Filtering devices constructed according to the preamble of claim 1 are known from the prior art.

In this known type of construction the filtering device consists of three main parts, namely a base part, a cap-shaped and in particular hollow cylindrical filter housing that is detachably connected via its free edge to the base part, and a tubular filter that is arranged in the filter housing and is connected at one front end to the base part and is supported at its other front end in the base region of the filter housing on the latter. The flow of the medium to be filtered may be directed in the tubular filter radially inwardly or radially outwardly. To this end there are provided in the base part two flow-through channels that can be connected to ongoing lines, one of which channels is connected to the interior of the filter, the other channel being connected to the free space between the filter and the circumferential wall of the filter housing.

These known types of constructions have the disadvantage that when removing the filter housing from the base part, for example to check or replace the filter, the filter remains on the base part on account of its particularly tight seal with the said base part and accordingly the filter housing has to be moved axially over the whole length of the filter from the base part before it can be laterally removed. To this end a relatively large installation space or free space is necessary in the vicinity of the filter housing, which is not always available in possible application sites of the filtering device. This is particularly the case with hydraulic drive or transmission units and with construction machinery such as diggers, excavators, loaders, earth-moving equipment, drilling equipment, cranes and similar machinery in which a compact type of construction is required.

The object of the invention is accordingly to provide a filtering device of the type mentioned in the introduction so that installation or dismantling of the filter housing is possible even in tight spatial conditions in the vicinity of the filter housing.

This object is achieved by the features of claim 1. Advantageous modifications of the filtering device are described in the subclaims.

In the filtering device according to the invention a fixing device is provided in order to secure the filter in the base region of the filter housing or to hold the filter in position against a stop means arranged in the base region of the filter.

With both solutions according to the invention the filter housing and the filter together form a moving unit. In this way it is ensured that when the filter housing is removed from the base part the filter remains in position in the filter housing and accordingly the filter housing has to be removed axially from the base part only along a small section, namely has to be removed sufficiently far that the filter is then no longer in contact with the base part. The filter housing and the filter can then be removed laterally as a moving unit. As a result it is possible to install and dismantle the filter housing even in the case of a correspondingly small installation and dismantling space in the axial direction.

Within the scope of the invention the securement of the filter in the base region of the filter housing or a charging of the filter in the direction of the base region of the filter housing may be effected in various ways. In an advantageous modification the filter is tensioned by the force of a spring axially against the base region, wherein the spring may be arranged for example between the base part and the oppositely facing front end of the filter. Another possibility is to provide a fixed connection between the filter and the filter housing, which may be formed for example by a clamping device or a screw arrangement.

The subclaims contain features that lead to simple, small and inexpensively achievable forms of construction, that simplify the installation and dismantling, and furthermore ensure an advantageous flow behaviour and/or filter operation.

Figure 2:
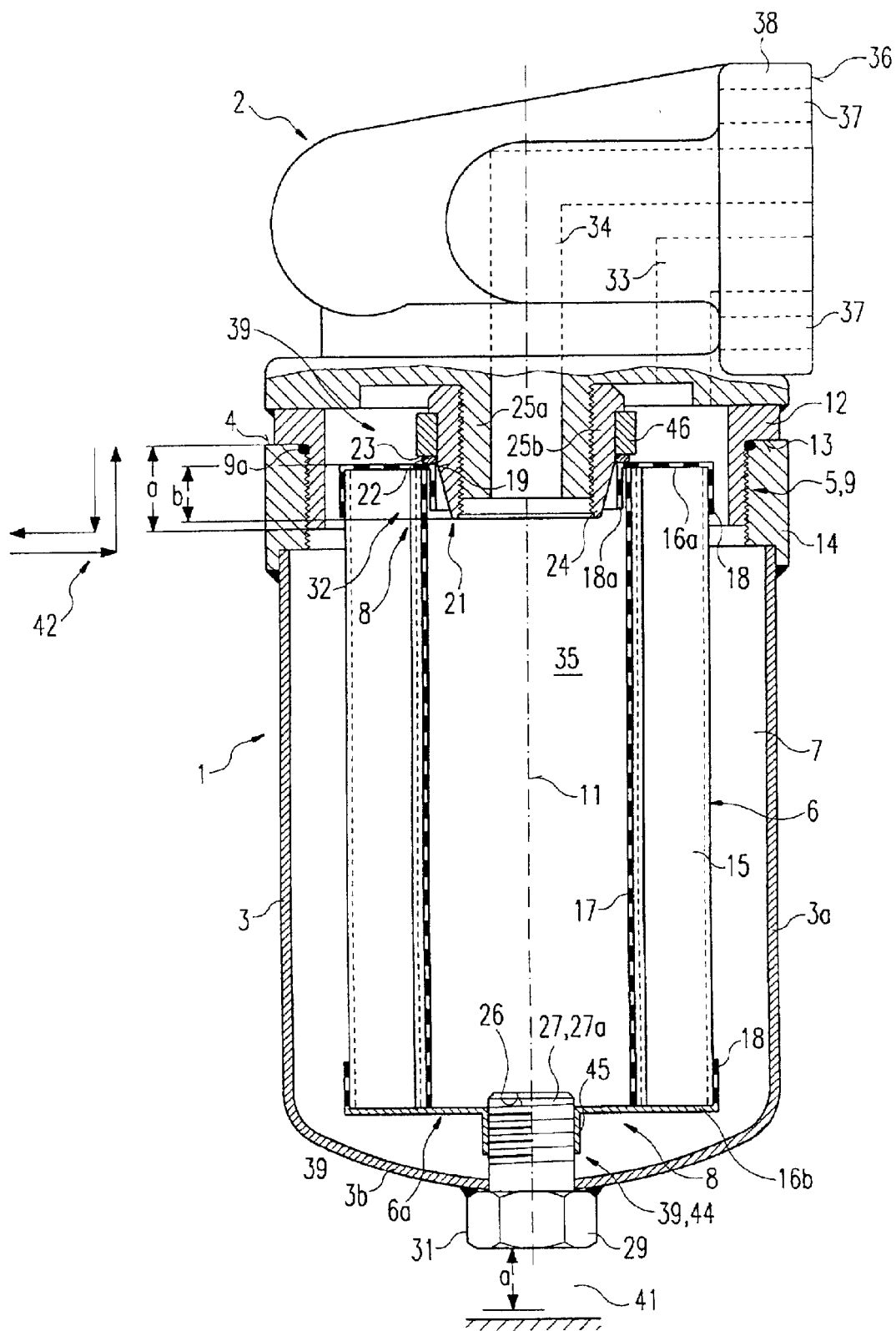

The invention and the advantages achievable thereby are illustrated in more detail hereinafter with the aid of preferred embodiments and drawings, in which:

FIG. 1 is a longitudinal section through a filtering device according to the invention, and FIG. 2 shows a modified version of the filtering device according to FIG. 1.

The main parts of the filtering device, generally designated by the reference numeral 1, are a base part 2 by means of which the filtering device 1 can be mounted on a support formed for example by a machinery part or equipment part, a cap-shaped filter housing 3 that is preferably circular in cross-section and that is connected in the region of its free edge 4 by a detachable connection device 5 to the base part 2, and a hollow cylindrical filter 6 that is arranged in the filter housing 3 with a free space 7 between the filter and the circumferential wall 3a of the filter housing and is held by means of a holding device 8 in its inserted position in the filter housing 3 on the base part 2 and filter housing 3.

In the present embodiment the connection device 5 is a screw connection with a threaded engagement 9 between the free edge 4 of the filter housing 3 and the base part 2, in this case a connecting sleeve 12 standing apart from the base part 2 and coaxially to the longitudinal central axis 11 of the filter housing 3, that may be formed in two parts or integrally with the base part 2. The inner and outer threads of the screw connection may in each case be arranged as desired on one or other part of the connection device 5. In the present embodiment the free edge 4 has an inner thread that can be screwed onto an outer thread on the connecting sleeve 12, the said outer thread being arranged in the tapering region of the connecting sleeve, a shoulder surface 13 thereby being formed that limits, by means of a stop means, the extent to which the inner thread can be screwed on, onto which shoulder surface the front surface of the free edge 4 can be screwed. In order to seal the screw connection a sealing ring 9a, for example an O-ring, may be provided that is preferably arranged in the corner region of the tapering section of the connecting sleeve.

In order to save material and weight, the filter housing 3 may consist of a thin sheet material, e.g. metal or steel sheet, that for the purposes of stabilisation is rigidly connected, e.g. welded, in the region of the free edge 4 to a reinforcing ring 14.

The tubular filter 6 has a jacket 15 permeable to the medium that is to be filtered, in particular a liquid such as hydraulic oil, that can form a filter unit with end discs or end caps 16a, 16b preferably of sheet material, arranged at both ends. In order to stabilise the jacket 15 a perforated inner sleeve 17 may be provided on which the jacket 15 sits, and which may be part of the jacket 15 or part of one of the two end caps 16a, 16b. The end caps 16a, 16b may overlap the jacket 15 by means of connecting sleeves 18 arranged on their outer edges. In the present embodiment the end cap 16a arranged adjacent to the base part 2 may also have a comparable connecting sleeve 18a that engages with a degree of play in the jacket 15 and/or in the inner sleeve 17.

The end cap 16a has a concentric, in particular round, receiving hole 19 by means of which it sits on a receiving pin 21 coaxially projecting from the base part 2, and with regard to its position in the filter housing 3 is centred at least in the region of this end of the filter body. In order to seal the jacket 15 and/or the associated end cap 16a against the receiving pin 21, an annular seal 22, e.g. an O-ring, may be provided which may be arranged between these parts to be sealed and a shoulder surface 23. In the present embodiment the shoulder surface 23 is formed by an annular disc 23a that sits on the receiving pin 21. In order to facilitate the mounting of the filter unit 6a that is thereby formed, on the receiving pin 21, the latter has an insertion surface 24 in the form of a rounded-off or conical chamfer in its free outer edge.

In the present embodiment the receiving pin 21 is formed by a pin support 25a projecting coaxially from the base part 2, on which support sits a receiving sleeve 25b, screwed on for example by means of a screw connection, which also includes the insertion surface 24.

On the end of the filter unit 6a remote from the base part 2 there is provided a second shoulder surface 26 arranged opposite the first shoulder or stop surface 23, against which shoulder surface 26 rests the respective end of the filter unit 6a. In the present embodiment a positioning pin 27 is provided in the base region or on the base wall 3b of the filter housing 3, which projects inwardly and in the installed position rests against the respective end cap 16b, which for this purpose may have a concavity 28 in which the positioning pin 27 engages. It is advantageous to form the positioning pin 27 by a preferably cylindrical bolt 27a secured to the base wall 3b and projecting axially therefrom. It is furthermore advantageous to arrange on the outside of the filter housing 3 a combined rotatable means and gripping element for screwing the filter housing 3 on and off. The gripping element may be arranged on a central outside projection on the base wall 3b. In the present embodiment the gripping element is formed by an internal or external polygonal element 29 that is arranged on the top of a bolt head 31 that together with its shaft passes inwardly through the base wall 3b and forms the positioning pin 27. The projection or bolt head may be secured by welding to the base wall 3b.

The aforedescribed holding device 8 for holding the filter unit 6a on the base part 2 and in the filtering device 1 thus comprises limiting or clamping surfaces 23, 26 axially limiting the filter unit 6a, which are axially activated when the filter housing 3 is screwed on, and a centering arrangement 32 for the filter unit 6a, which acts at least at its end facing the base part 2, or at both ends.

When the filtering device is in operation the medium to be filtered flows to the filter 6 through two through-flow channels 33, 34 passing through the base part 2, one through-flow channel being connected to the free space between the receiving pin 21 and the connecting sleeve 12 and thus also to the free space 7, and the other through-flow channel 34 being connected to the hollow space 35 surrounded by the filter unit 6a. The through-flow channels 33, 34 terminate at their other ends in a planar mounting surface 36 of the base body 2, which in the present arrangement is arranged laterally relative to the longitudinal centre axis 11 and has a larger radial dimension than the remaining parts of the filtering device, in particular the filter housing 3, so that the filtering device 1 can be mounted in a problem-free manner on a mounting surface (not shown) of an apparatus or a machine or the like, in which continuing channels are arranged for the medium to be filtered. The flow direction of the medium to be filtered may in the region of the filter unit 6a be directed radially outwards or radially inwards. In order to secure the base part 2 to the mounting surface 36, screw holes 37 for example may be provided in a base wall 38 of the base part 2 comprising the mounting surface 36.

A fixing device 39 for fixing the filter unit 6a to the filter housing 3, in particular for fixing the filter unit 6a in the base region or floor region of the filter housing 3, is associated with the holding device 8. This fixing ensures that when the filter housing 3 is detached the filter unit 6a moves with the latter, and accordingly the filter housing 3 together with the filter unit 6a can be removed, for example laterally, from the base part 2 in order for example to check the filter or to replace the filter unit 6a or the filter body. Only a small free space, denoted by 41, between the filter housing 3 and the apparatus or machine on which the filtering device 1 is to be installed, is therefore required in the axial direction. The same comments also apply of course to an installation procedure. The respective axial and transverse movements are denoted by the double arrows 42. Preferably the degree of axial overlapping a of the connection device 5 is greater than the degree of axial overlapping b between the filter unit 6a and the receiving pin 21, so that on axial disengagement the filter unit 6a is released from contact with the receiving pin 21 before the filter housing 3 is completely detached, and during installation the connecting parts of the connection device 5 first of all come into contact and then the filter unit 6a comes into contact with the receiving pin 21.

In the present embodiment the fixing device 39 has an axially acting spring 43, e.g. a conical coil spring, that is supported on the base part 2 and that tensions the filter unit 6a in the direction of the base wall 3b so that on disengagement of the filter housing 3 the filter unit 6a moves together with the filter housing 3 and remains thereon on account of the spring tension until the connection device 5 is released.

In the present embodiment the spring 43 engages the annular disc 23a and thereby acts directly on the filter unit 6a via the annular seal 22. The spring 43 is preferably fixed to the base part 2 so that after disengagement of the filter housing 3 the spring remains on the base part 2. This can be accomplished if the end of the spring 43 facing the base part 2 is fixed to the said base part 2, for example by the receiving sleeve 25b, the end of which facing the base part 2 engages the rear of the smallest coil of the spring 43. Alternatively the spring 43 may also be secured to the filter unit 6a.

In the embodiment according to FIG. 2, in which identical or comparable parts are provided with the same reference numerals, the fixing device 39 has a fixed but preferably detachable connection between the filter unit 6a and the filter housing 3, this connection being arranged in particular in the base region of the filter housing 3. In the present embodiment a screw connection 44 is provided between the filter unit 6a and the base region of the filter housing. The screw connection 44 may be formed by an inner thread in a terminal collar 45 of the associated end cap 16b and by an outer thread on the positioning pin 27, the filter unit 6a together with the collar 45 being screwed onto the positioning pin 27. On account of the fixed connection between the filter housing 3 and the filter unit 6a, the spring 43 present in the embodiment according to FIG. 1 may be omitted. This also applies to the annular disc 23a that forms the shoulder surface 23 for the annular seal 22. Such a shoulder surface 23 could be arranged on the receiving pin 21 or on the receiving sleeve 25. In the present embodiment the resting surface or shoulder surface 23 is formed by the associated front face of a spacing sleeve 46 that sits on the receiving pin 21 or on the receiving sleeve 25b and that may be supported on a shoulder surface of the receiving sleeve 25b or directly on the base part 2.

What is claimed is:

1. Filtering device (1) including a tubular filter (6), which is supported at one end thereof on a base part (2) and at an opposite end thereof on a cup-shaped filter housing (3), which overlaps the filter (6) with a radial free space (7) and is detachably connected by a screw connection at an edge (4) to the base part (2), said base part (2) having a first throughflow channel (33), connected to the free space (7) and a second through-flow channel (34), connected to a hollow space (35) of the filter (6), a screwthread of the screw connection of the base part (2) being arranged at a free edge of a connecting sleeve (12) of the base part (2) facing towards the filter housing (3), including a fixing device (39) for holding the filter (6) in position against the filter housing (3), characterized in that the fixing device (39) is formed by a screw connection (44), which is arranged between the bases of the filter (6) and the filter housing (3), the end of the filter (6) facing towards the base part (2) being seated on the receiving pin (21) projecting from the base part (2), the screwthread of the screw connection of the filter housing (3) being arranged at the free edge (4) of the filter housing (3) facing towards the base part (2), and the filter housing (3), upon being unscrewed from the connecting sleeve (12) by the degree of overlapping (a) between the filter housing (3) and the connecting sleeve (12), is moved transversally with the filter (6) under the receiving pin (21) and under the connecting sleeve (12).

2. Filtering device (1) including a tubular filter (6), which is supported at one end thereof on a base part (2) and at an opposite end thereof on a cup-shaped filter housing (3), which overlaps the filter (6) with a radial free space (7) and at an edge (4) is detachably connected to the base part (2), said base part (2) having a first through-flow channel (33), connected to the free space (7) and a second through-flow channel (34) connected to a hollow space (35) of the filter (6), and wherein a fixing device (39) is provided for securing the filter (6) on the filter housing (3) or for holding the filter (6) in position against the filter housing (3), characterized in that the base part (2) includes on one side a base wall (38) with a lateral mounting surface (36), from which the there exit the first through-flow channel (33) and the second through-flow channel (34), and screw holes (37) being provided in the base wall (38).

3. Filtering device, according to claim 1 or 2, wherein said fixing device (39) has a spring (43), which tensions the filter (6) in a direction towards the base of the filter housing (3).

4. Filtering device, according to claim 3, wherein the spring (43) engages the end of the filter (6) facing towards the base part (2).

5. Filtering device, according to claim 3, wherein the spring (43) is arranged between the base part (2) and the end of the filter (6) facing towards said base part.

6. Filtering device, according to claim 3, wherein the spring (43) is a coil spring.

7. Filtering device, according to claim 2, wherein the end of the filter (6) facing towards the base part (2) is seated on a receiving pin (21) projecting from the base part (2).

8. Filtering device, according to claim 6, wherein the spring (43) is arranged on the receiving pin (21).

9. Filtering device, according to claim 6, wherein an annular O-ring seal (22) is arranged between the receiving pin (21) and the filter (6).

10. Filtering device, according to claim 9, wherein the annular seal (22) is arranged between the filter (6) and an annular disc (23a), the spring (43) tensioning the annular disc (23a) against the filter (6).

11. Filtering device, according to claim 6, wherein the filter (6) is centered on a positioning pin (27).

12. Filtering device, according to claim 11, wherein the positioning pin (27) engages in a recess forward in the end cap (16b).

13. Filtering device, according to claim 10, wherein the end of the filter (6) facing towards the base part (2) is seated on a receiving pin (21) projecting from the base part (2).

14. Filtering device, according to claim 1 or 2, wherein a positioning pin (27) passes in a rotationally fixed manner through a hole forward in a base wall (3b) of the filter housing (3), and a gripping element (31) is arranged accessible from the outside on the positioning pin (27) and is formed by an internal or external polygonal element (29) for imparting rotational movement to said filter housing (3).

* * * * *